June 23, 1964  A. F. SCHUMANN  3,138,037
DIFFERENTIAL ROTATION MECHANISM
Filed April 21, 1961  5 Sheets-Sheet 1

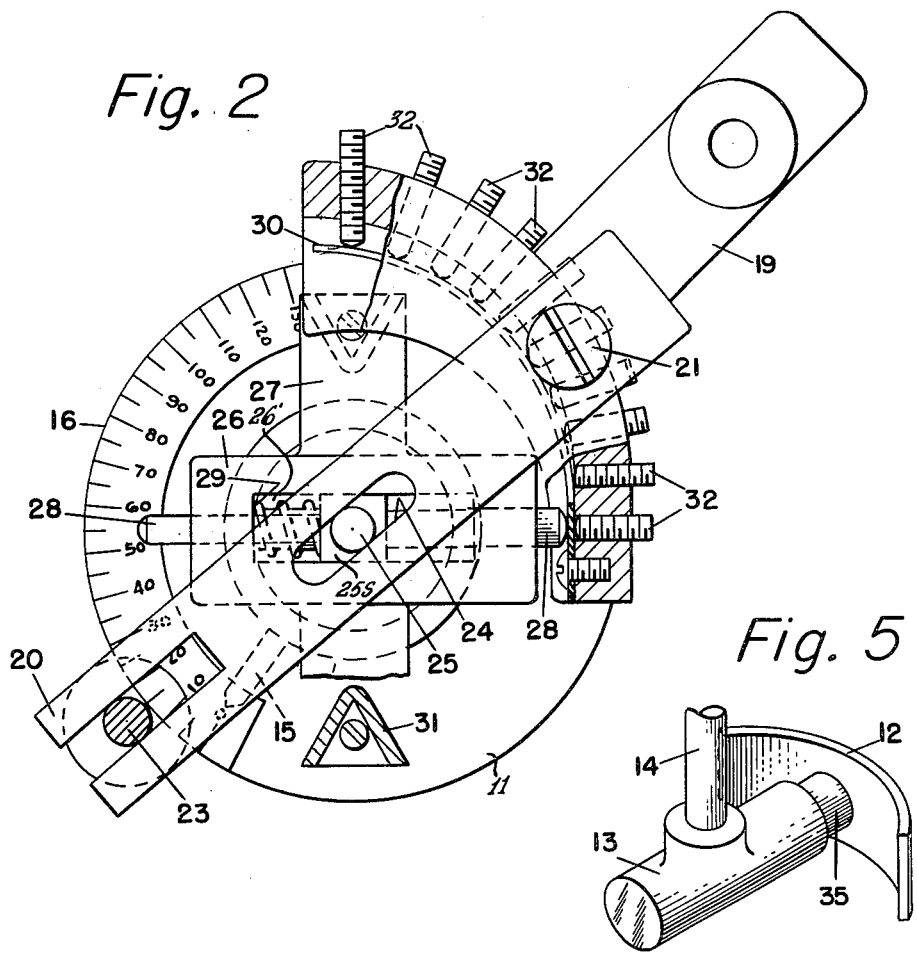
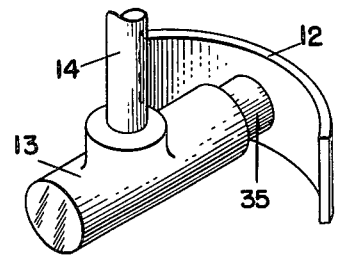
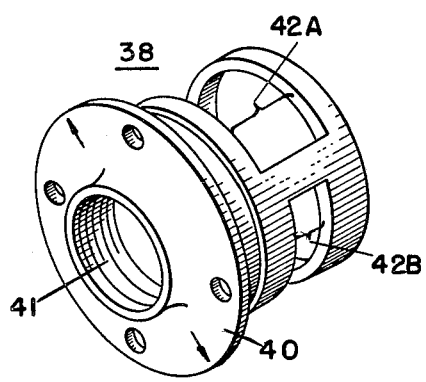
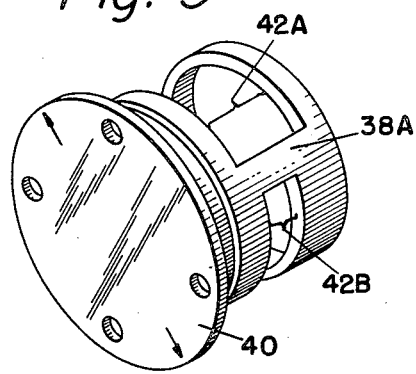

June 23, 1964  A. F. SCHUMANN  3,138,037
DIFFERENTIAL ROTATION MECHANISM
Filed April 21, 1961  5 Sheets-Sheet 3

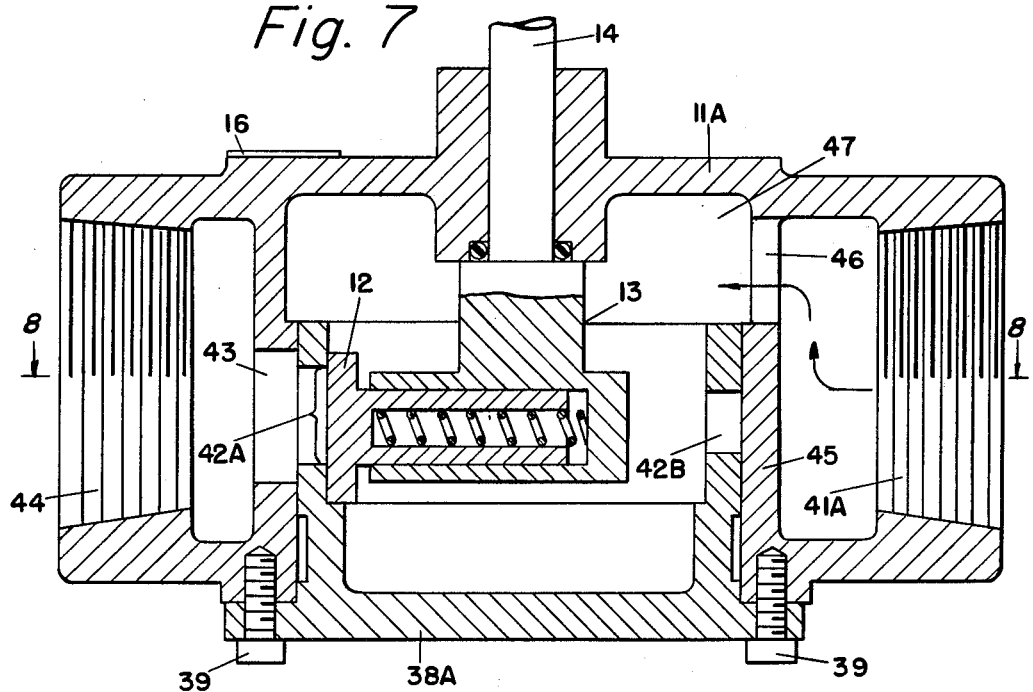
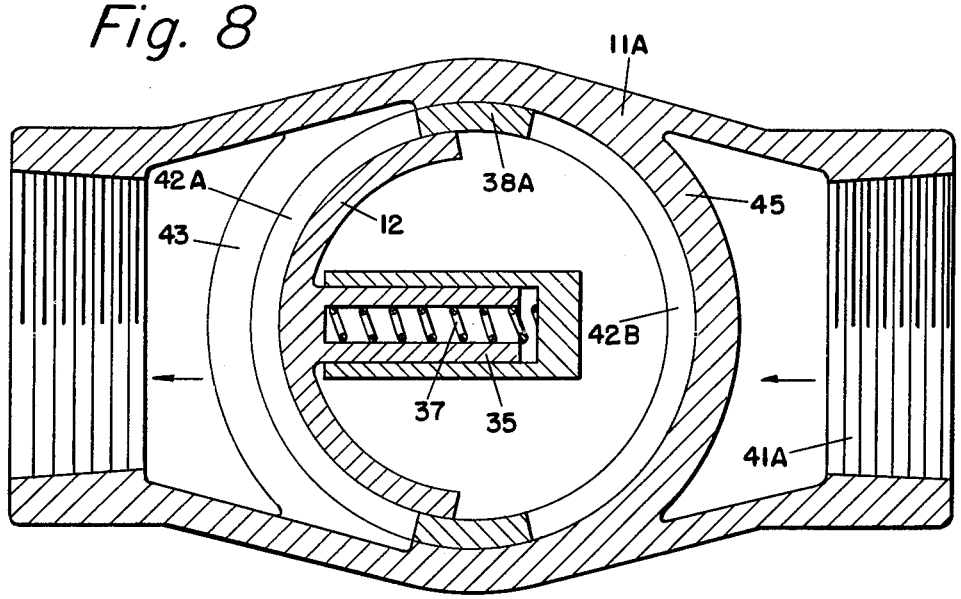

United States Patent Office 3,138,037
Patented June 23, 1964

3,138,037
DIFFERENTIAL ROTATION MECHANISM
Alfred F. Schumann, 20 Allendale Road, Lower Merion
Township, Montgomery County, Pa.
Filed Apr. 21, 1961, Ser. No. 104,735
5 Claims. (Cl. 74—516)

This invention relates to differential rotation mechanism suited for adjusting the position of a shaft such as that of a valve used for example for controlling the supply of air or other gas to the burners of industrial furnaces, ovens, kilns and the like.

In accordance with the present invention, the actuating arm of a shaft, such as a valve stem, is coupled to its operating arm by a linkage including a floating fulcrum which, under the control of a cam, varies the ratio between successive increments of movement of the operating arm and the resulting corresponding increments of movement of the actuating arm.

Further in accordance with the invention, the aforesaid cam is deformable, as by a series of screws spaced along its length, both to change the ratio of the total range of movement of the actuating arm to a fixed total range of movement of its operating arm as well as to vary the ratio of the concurrent incremental movements of said actuating arm and said operating arm for different parts of the range of movement of the latter.

The invention further resides in operating linkages for valve shafts and the like having features of capability and utility hereinafter described and claimed.

For a more detailed understanding of the invention, reference is made in the following description of preferred embodiments thereof to the accompanying drawings in which:

FIG. 2 is a top plan view of parts shown in FIG. 1;

FIG. 5 is a perspective view of the movable valve plate or shoe of FIGS. 1, 7 and 8;

FIG. 6 is a perspective view of the dual port cage shown in FIG. 1;

FIG. 7 is a sectional view of a straight-through valve-body for replacement of the angle valve-body of FIG. 1;

FIG. 8 is plan view, in section, taken on line 8—8 of FIG. 7;

FIG. 9 is a perspective view of the dual-range port cage shown in FIGS. 7 and 8.

Figure 1:
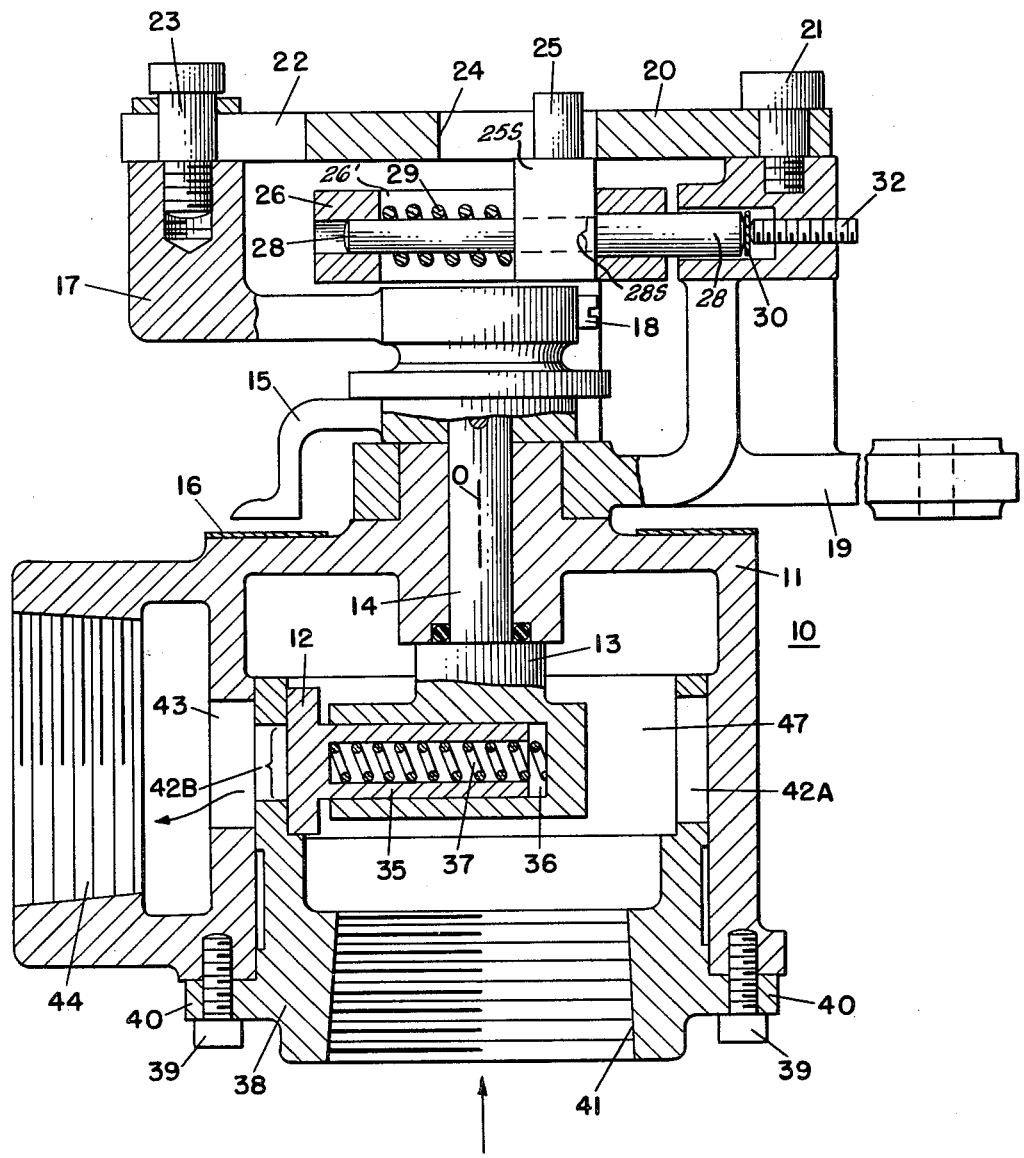
FIG. 1 is a side elevational view, in section, of a flow-control valve including its operating linkage.

Referring to FIG. 1 as exemplary of one form of the mechanism as used for valve operation, the valve 10 includes the body 11 in which the arcuate valve plate or shoe 12 is rotatable to control the flow of air or other gas through the valve. The supporting member 13 of the valve shoe is attached to the lower end of shaft 14 which extends through the valve-body 11. The pointer 15 attached to the outer portion of valve shaft 14 in fixed position relative to valve shoe 12 cooperates with scale 16 (FIGS. 1 and 2) attached to the upper face of the valve-body. The actuating arm 17 is fastened to the upper end of valve shaft 14, as by clamping screw 18, in any angular relation thereto required to obtain a desired minimum or maximum setting of valve member 12 for the low or high limit of the fixed range of movement of the operating arm 19.

In the particular arrangement shown in FIGS. 1 and 2, a link 20 is pivotally connected at one end to operating arm 19 by the fulcrum pin 21. The other end of link 20 is slotted at 22 rotatably and slidably to engage the fulcrum pin 23 of the actuating arm 17. Intermediate its ends, the link 20 has a slot 24 rotatably and slidably to receive a floating fulcrum pin 25. The head 26 of bracket 27 (FIGS. 1, 2 and 3) is slotted at 26' to serve as a guide for the lower squared end 25S of the fulcrum pin 25. The shaft or pin 28 passes through the lower squared portion 25S of pin 25 with its opposite ends slidably received by bearings in the head 26 of bracket 27. The spring 29 encircling the shaft 28 forces the squared lower portion 25S of pin 25 against the shoulder 28S of the shaft 28.

The spring 29 also biases the whole floating assembly, comprising shaft 28 and pin 25, to the right to maintain engagement between the cam-follower end of shaft 28 and a cam structure 30 carried by the operating arm 19 of the valve. The legs 31 of bracket 27 are fastened at their lower ends to the upper face of valve-body 11 preferably in such position that the line of movement of the floating fulcrum pin 25 substantially bisects the range of arcuate movement of the operating arm 19. So mounted, the line of movement F—F of the floating fulcrum pin, as indicated in FIG. 4A, is radially of the axis of rotation O of shaft 14, with the fixed range of movement of operating arm 19 lying within the quadrants I and II and the maximum range of movement of actuating arm 17 lying within the quadrants III and IV.

Figure 3:
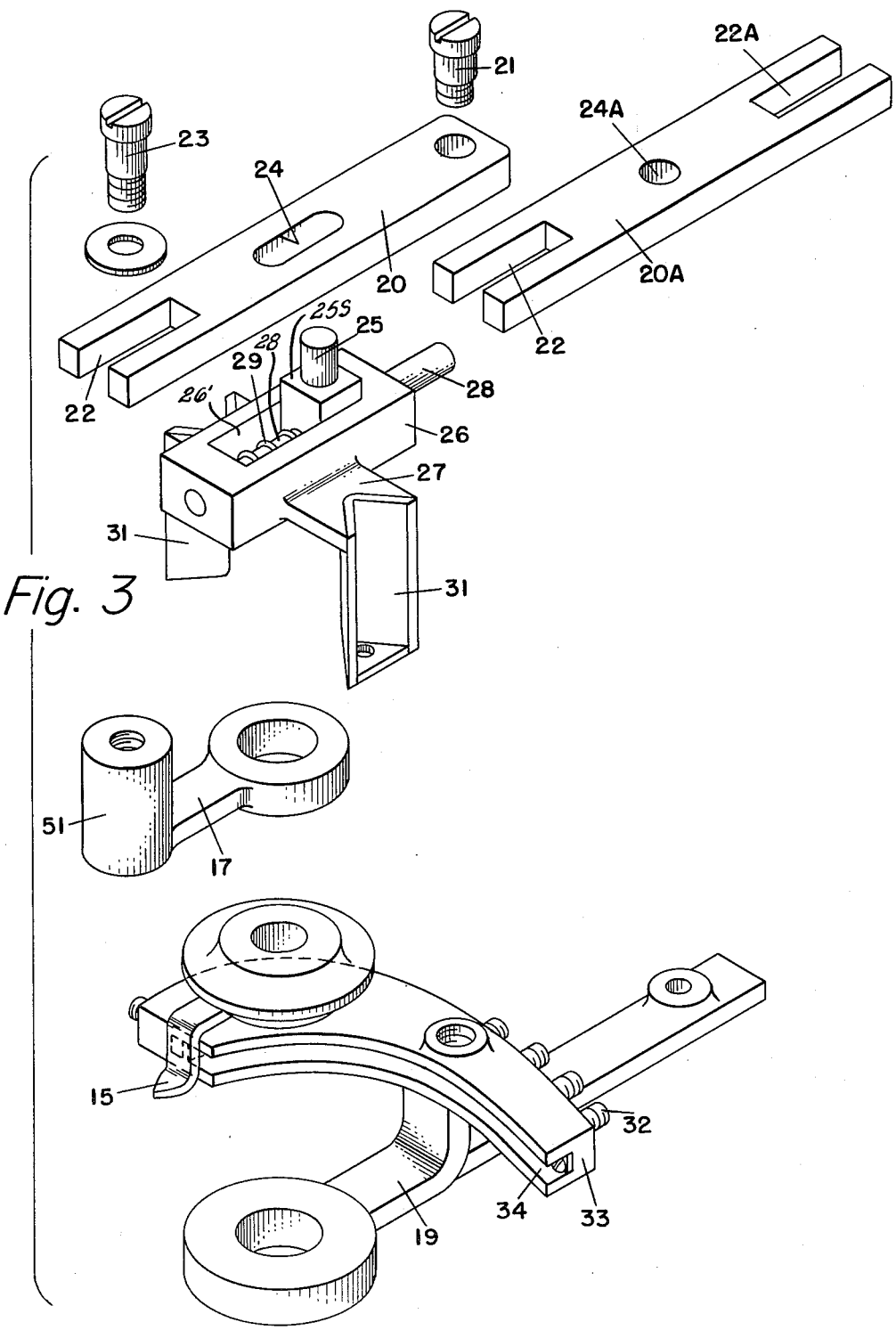
FIG. 3 is an exploded view showing the elements of the operating linkage of FIG. 1.

As shown in FIGS. 2 and 3, the angular extent of cam 30 substantially corresponds with the range of movement of the operating arm 19 and the shape of the cam, which is of springy metal, can be varied by adjustment of screws 32. These screws are threadably received by the cam head 33 formed with or attached to the operating arm 19 and bear against the rear face of cam strip 30 at points spaced along its length. The groove 34 in the cam head maintains the cam strip in the path of the cam-follower end of shaft 28 of the floating fulcrum assembly.

With the cam adjusted as shown in FIG. 2 and with the operating arm 19, as shown, at the limit of its counterclockwise rotation, the floating fulcrum pin 25 (FIGS. 2 and 4A) is at the axis of rotation O of arms 17 and 19. As the operating arm 19 is moved from that position in clockwise direction, the fulcrum pin 25 for link 20 is progressively displaced to the right in accordance with the shape of cam 30. Accordingly, and as more fully discussed in connection with FIG. 4A, as the operating arm 19 is moved in clockwise direction from the position shown in FIG. 2 through successive small equal arcs to the other limit of its range of movement, the corresponding successive angular movements of the valve-actuating arm 17 become larger and larger. For the fixed range of movement of the operating arm 19, both the range of total movement of the actuating arm 17 and the relationship of its incremental movements to that of arm 19 can be varied by adjustment of screws 32 to flex or deform the cam strip 30.

Figure 4A:
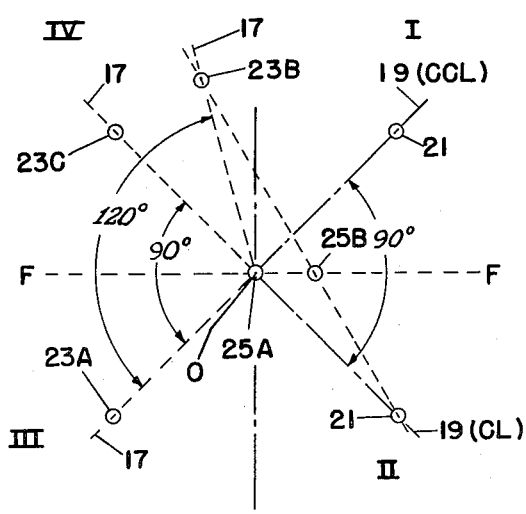
FIGS. 4A and 4B are explanatory figures referred to in discussion of FIGS. 1 to 3 and 10.
Figure 4B:
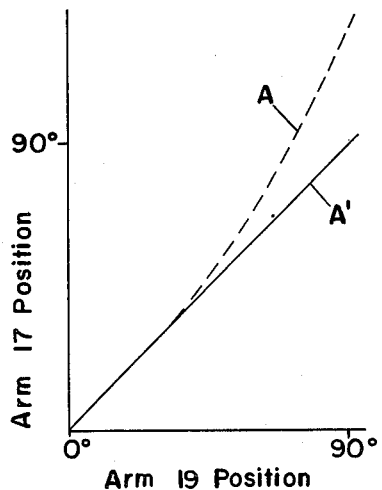

Referring to FIG. 4A, it is first assumed with arm 19 at the counterclockwise limit CCL of its range of movement, the floating fulcrum pin is at position 25A in alignment with axis O of arms 19 and 17. It is further assumed that cam 30 is so shaped or adjusted that with arm 19 at the clockwise limit CL of its travel, the floating fulcrum pin 25 is at position 25B to the right of axis O. In such case, the movement of operating arm 19 through its 90° range of movement, effects movement of the valve-actuating arm 17 from position 23A to position 23B through an arc substantially exceeding 90° (about 120°) and generally in accordance with valve-position or flow curve A of FIG. 4B. As there indicated, the ratio of the incremental movements of the arms 19, 17 increases at progressively rapid rate as arm 19 is moved in clockwise direction between its limits of travel.

It is now assumed that screws 32 are so adjusted that cam 30 is an arc of substantially constant radius with its center coincident with the floating fulcrum pin at position 25A. In this case, the movement of operating arm 19 through its 90° range of movement effects movement of the valve-actuating arm 17 from position 23A to position 23C through an arc of 90° and generally in accordance with valve-position or flow curve A' (FIG. 4B) which is lesser slope and is, to all practical purposes, essentially linear.

It is, of course, to be understood that within the limits of adjustment of cam 30 afforded by screws 32, it is possible to obtain lesser and greater ranges of total movement of valve arm 17 for the fixed range of operating arm 19 and to obtain a family of flow-control curves so to adapt the same valve to a wide variety of applications.

When the valve 10 is not used as a shut-off valve, a second valve in series with it is used for turn-on and turn-off purposes. In either case, the ranges of adjustment and rates of change in valve position afforded as above described are for flow-control purposes, i.e., each range is a throttling range and the cam shape primarily determines the throttling rate for a given change in position of the operating arm 19. The amount of gas, for a given supply pressure, passed by the valve 10 for either limit of travel of the operating arm 19 and for any setting of cam 30 can be preset by unloosening screw 18, setting the valve shoe 12 to the desired flow-control position, and then re-tightening the screw 18 to re-fasten the valve shaft 14 to the actuating arm 17. It is to be noted that the pointer 15 remains attached to the valve shaft 14 in fixed angular relation so that it may be used to set the movable valve element 12, when screw 18 is loosened, to one limit of the desired throttling range as well as at all times indicating the position of the valve element 12 for monitoring purposes. Usually, the arm 17 is coupled to the valve shaft 14 with valve element 12 so oriented that clockwise movement of arm 19 effects opening movement of the valve.

In adjusting the shape of cam 30, the arm 19 is moved to bring each screw 32 in turn in alignment with the supporting shaft 28 of the floating fulcrum pin 25. While so aligned, the screw is adjusted until the desired position of the valve as read from scale 16 is the one desired for the corresponding position of operating arm 19.

As shown in FIGS. 1 and 5, the movable valve element 12 is an arcuate plate or shoe attached to the outer end of a piston or plunger 35 slidably received in the bore 36 of the supporting member 13. In arcuate extent, the valve shoe 12 is somewhat greater than the associated port opening of port cage 38 later described. The valve shoe 12 is biased by spring 37 against the inner cylindrical face of the port cage 38 which is held within the valve-body 11 by screws 39. In this modification, the lower or flanged face 40 of the port cage 38 has a threaded flow passage 41 for connection to an intake pipe (not shown). As more clearly shown in FIG. 6, the cage 38 has two port slots or openings 42A, 42B of substantially different width and each somewhat less than 180° in angular extent. By way of example, the width of port 42A may be of the order of twice that of port 42B and suitably less than the width of the cooperating valve plate or shoe 12. With the screws 39 temporarily removed, the cylindrical cage 38 may be rotated within the corresponding recess of valve-body 11 to bring either of ports 42A, 42B into alignment with the outlet port 43 in the valve-body. Thus, with no additional parts, the same valve may be used for different applications requiring substantially different throttling range in terms of cubic feet of gas per unit of time. This dual range port cage in association with the operating linkage above described affords great flexibility, permitting a single valve to be used in a great variety of applications.

When the piping of an installation requires the valve to be of the straight-through type rather than the angle-type shown in FIG. 1, the exterior flanged face of the port cage 38A, FIG. 9, has no inlet opening and the valve body 11A is provided both with a threaded outlet passage 44, as in FIG. 1, and also with a threaded inlet passage 41A, FIGS. 7 and 8. The interior wall 45 of the valve-body 11A blocks the port cage passage 42A or 42B not in use for the selected cage setting, but leaves an inlet port 46 for flow into the cylindrical valve chamber 47. As in FIG. 1, the effective size of the port opening from chamber 47 to the discharge passage 44 is controlled by varying the position of the valve-shoe 12 with respect to the selected port 42A or 42B of the port cage.

Figure 10:
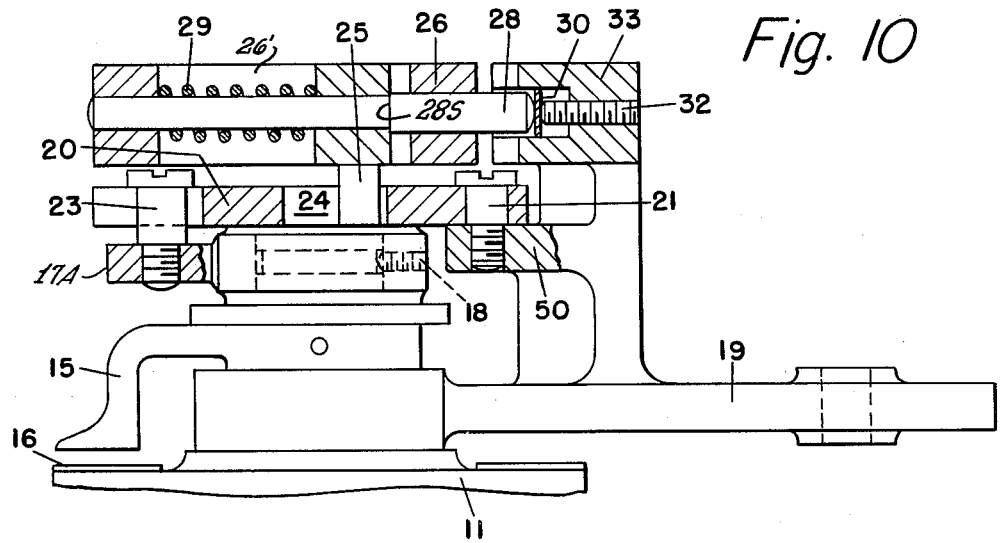
FIG. 10 is a view of the flow-control valve with a modification of the operating linkage shown in FIG. 1.

Either of the valve-body and cage arrangements above described can be used with the operating linkage of FIG. 1 or with the modification thereof shown in FIG. 10. The latter is essentially the same as that of FIG. 1, differing principally in that the supporting bracket of the floating fulcrum 25 is above rather than below the connecting link 20 between the actuating and operating arms 17 and 19. Accordingly, the corresponding elements of both linkages are identified by the same reference characters so that the previous description is applicable to FIGS. 1 and 10 (corresponding parts of different shape are identified by the same reference characters plus a suffix). In the more compact arrangement of FIG. 10, the fulcrum pin 21 is fastened to the ledge 50 below the cam head 33 rather than to the upper face of the cam head as in FIG. 1 and the fulcrum pin 23 is correspondingly lowered by omitting the boss 51 of arm 17 (FIGS. 1 and 3). With the bracket head 26 above the link 20, the floating fulcrum pin is inverted in FIG. 10 for reception of slot 24 of link 20.

As in FIG. 1, the bracket for head 26 straddles the hub of the actuating and operating arms with the legs of the bracket attached to the upper face of the valve-body. The bracket legs, as in FIG. 1, serve as stops limiting the range of movement of the operating arm 19 to about 90°. In both linkages, the link 20 may be reversed end-to-end from the position shown so that it is fixedly pivotally connected to the actuating arm by pin 23 and is slidably pivotally connected to the operating arm 19 by pin 21. Alternatively, in both linkages, the link 20 may be replaced by a link 20A (FIG. 3) which is slotted at both ends and which intermediate its ends has a pivot hole 24A closely fitting the floating fulcrum pin 25. In the last-named arrangement, the slots 22 and 22A respectively slidably and rotatably engage the fulcrum pins 21 and 23 of arms 17 and 19 or vice versa. In all three cases, the link between the actuating arm 17 or 17A and the operating arm 19 has a fixed pivotal connection to one of the pivot pins 21, 23, 25, or equivalent, and slidably pivotally engages the other two of them.

It shall also be understood that cam 30 may be attached to or mounted on the actuating arm 17 or 17A instead of the operating arm 19, in which case, of course, the position of the bracket for the floating assembly is angularly displaced from the position shown in FIG. 1. In general, the invention is not limited to the specific construction shown, but comprehends modifications thereof within the scope of the appended claims.

What is claimed is:

1. A differential rotation mechanism for a shaft extending through a base, comprising an operating arm rotatable on the base about the axis of said shaft, a first pivot on the operating arm spaced from the axis of the shaft, an actuating arm fixed to said shaft for rotation therewith, a second pivot on the actuating arm spaced from the axis of the shaft, a cam on one of the arms, means fixed to the base for supporting a third pivot, said third pivot having an end slidable in the supporting means, a pin extending between the said end of the third pivot and the cam, said pin being biased against the cam to vary the position of the slidable third pivot on its fixed supporting means; and an elongated link connecting all of said pivots and having openings elongated lengthwise of the link for both rotatably and slidably receiving two of said pivots.

2. A differential rotation mechanism as in claim 1 in which said openings elongated lengthwise of the link are respectively for the slidable third pivot and one of the other pivots.

3. A differential rotation mechanism as in claim 1 in which said openings elongated lengthwise of the link are respectively for the first and second pivots.

4. A differential rotation mechanism as in claim 1 in which the line of movement of the slidable third pivot is radially of the axis of rotation of the shaft, and in which the operating and actuating arms are respectively movable in quadrants on opposite sides of said axis of rotation.

5. A differential rotation mechanism as in claim 1 in which the cam carried by one of the arms is a deformable strip, and in which said one of the arms carries a series of adjustable means for deforming increments of the cam strip successively engaged by said pin.

References Cited in the file of this patent
UNITED STATES PATENTS

| | | |
|---|---|---|
| 746,545 | Mertens | Dec. 8, 1903 |
| 944,155 | Shurtleff | Dec. 21, 1909 |
| 1,109,441 | McGowan | Sept. 1, 1914 |
| 1,135,655 | Beemer | Apr. 13, 1915 |
| 2,177,873 | Nordstrom | Oct. 31, 1939 |
| 2,894,399 | Spence | July 14, 1959 |
| 2,930,245 | Wiggs | Mar. 29, 1960 |